US009221496B2

(12) United States Patent
Barr et al.

(10) Patent No.: US 9,221,496 B2
(45) Date of Patent: Dec. 29, 2015

(54) SUSPENSION MODULE HAVING A SKIDPLATE

(71) Applicant: ArvinMeritor Technology, LLC, Troy, MI (US)

(72) Inventors: Paul Lawrence Barr, Rochester Hills, MI (US); Gordon Aaron Weeks, Auburn Hills, MI (US); Stephen A. Federighe, Washington, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 7 days.

(21) Appl. No.: 13/915,685

(22) Filed: Jun. 12, 2013

(65) Prior Publication Data
US 2014/0367951 A1  Dec. 18, 2014

(51) Int. Cl.
| B62D 21/00 | (2006.01) |
| B62D 21/15 | (2006.01) |
| B62D 21/11 | (2006.01) |
| B60K 17/16 | (2006.01) |

(52) U.S. Cl.
CPC .............. *B62D 21/155* (2013.01); *B60K 17/16* (2013.01); *B62D 21/00* (2013.01); *B62D 21/11* (2013.01); *B60G 2204/15* (2013.01); *B60G 2204/19* (2013.01)

(58) Field of Classification Search
USPC .................................... 280/124.156, 124.109
See application file for complete search history.

(56) References Cited

U.S. PATENT DOCUMENTS

| 5,199,526 | A  | * | 4/1993  | Derviller ...................... 180/297 |
| 5,327,989 | A  | * | 7/1994  | Furuhashi et al. ............ 180/248 |
| 5,538,274 | A  |   | 7/1996  | Schmitz et al. |
| 5,833,026 | A  | * | 11/1998 | Zetterstrom et al. .......... 180/360 |
| 6,357,769 | B1 | * | 3/2002  | Omundson et al. ..... 280/124.109 |
| 6,398,262 | B1 | * | 6/2002  | Ziech et al. .................... 280/785 |
| 6,516,914 | B1 | * | 2/2003  | Andersen et al. ............. 180/360 |
| 6,733,021 | B1 | * | 5/2004  | Ziech et al. ............ 280/124.109 |
| 6,752,235 | B1 | * | 6/2004  | Bell et al. ....................... 180/360 |
| 6,925,735 | B2 | * | 8/2005  | Hamm et al. ................... 37/231 |
| 7,143,861 | B2 | * | 12/2006 | Chu .............................. 180/346 |
| 7,207,600 | B2 | * | 4/2007  | Beckmann et al. ........... 280/781 |
| 7,380,831 | B2 |   | 6/2008  | Ziech et al. |
| 7,464,954 | B2 | * | 12/2008 | Grow ......................... 280/304.3 |
| 7,510,235 | B2 | * | 3/2009  | Kobayashi et al. ...... 296/193.01 |
| 7,850,181 | B2 | * | 12/2010 | Cordier .................. 280/124.109 |
| 7,896,369 | B2 | * | 3/2011  | Tomlin et al. .......... 280/124.116 |
| 8,029,021 | B2 | * | 10/2011 | Leonard et al. ............... 280/785 |
| 8,096,567 | B2 | * | 1/2012  | Cordier .................. 280/124.109 |
| 8,402,878 | B2 | * | 3/2013  | Schreiner et al. ............ 89/36.08 |
| 8,517,140 | B2 | * | 8/2013  | West et al. ..................... 180/360 |
| 8,522,911 | B2 | * | 9/2013  | Hurd et al. ..................... 180/312 |
| 2011/0079978 | A1 | * | 4/2011  | Schreiner et al. .......... 280/124.1 |
| 2011/0240393 | A1 | * | 10/2011 | Hurd et al. .................... 180/233 |
| 2012/0000719 | A1 | * | 1/2012  | Leonard et al. ............ 180/24.09 |
| 2013/0093154 | A1 | * | 4/2013  | Cordier et al. ......... 280/124.109 |
| 2014/0062047 | A1 | * | 3/2014  | Van Der Knaap et al. ...................... 280/124.109 |
| 2014/0124279 | A1 | * | 5/2014  | Schlangen et al. ........... 180/68.4 |

* cited by examiner

*Primary Examiner* — Nicole Verley
(74) *Attorney, Agent, or Firm* — Brooks Kushman P.C.

(57) ABSTRACT

A suspension module for a vehicle. The suspension module may include a subframe, a skid plate, and a differential. The skid plate may be mounted to the subframe. The differential may be mounted to the skid plate.

18 Claims, 4 Drawing Sheets

SUSPENSION MODULE HAVING A SKIDPLATE

TECHNICAL FIELD

This application relates to a suspension module for a vehicle having a skid plate.

BACKGROUND

An independent suspension with an adjustable sub-frame is disclosed in U.S. Pat. No. 7,850,181.

SUMMARY

In at least one embodiment, a suspension module for a vehicle is provided. The suspension module may include a subframe, upper and lower control arms, a skid plate, and a differential. The subframe may be configured to be mounted to the vehicle. The upper and lower control arms may be pivotally mounted to the subframe. The skid plate may be mounted to the subframe proximate the lower control arm. The differential may be mounted to the skid plate.

In at least one embodiment, a suspension module for a vehicle is provided. The suspension module may include a subframe, a skid plate, and a differential. The subframe may be configured to be mounted to the vehicle. The subframe may have first and second arms disposed along a first side of the subframe and third and fourth arms disposed along a second side of the subframe. The skid plate may be mounted to the first, second, third, and fourth arms. The differential may be mounted to the skid plate and may be spaced apart from the subframe.

In at least one embodiment, a suspension module for a vehicle is provided. The suspension module may include a subframe, a skid plate, and a differential. The subframe may be configured to be mounted to the vehicle. The subframe may have a first arm that may have a mounting notch that extends from an end surface of the first arm. The skid plate may be received in the mounting notch such that an upper surface of the skid plate engages the first arm. The differential may be mounted to the upper surface of the skid plate and may be spaced apart from the subframe.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
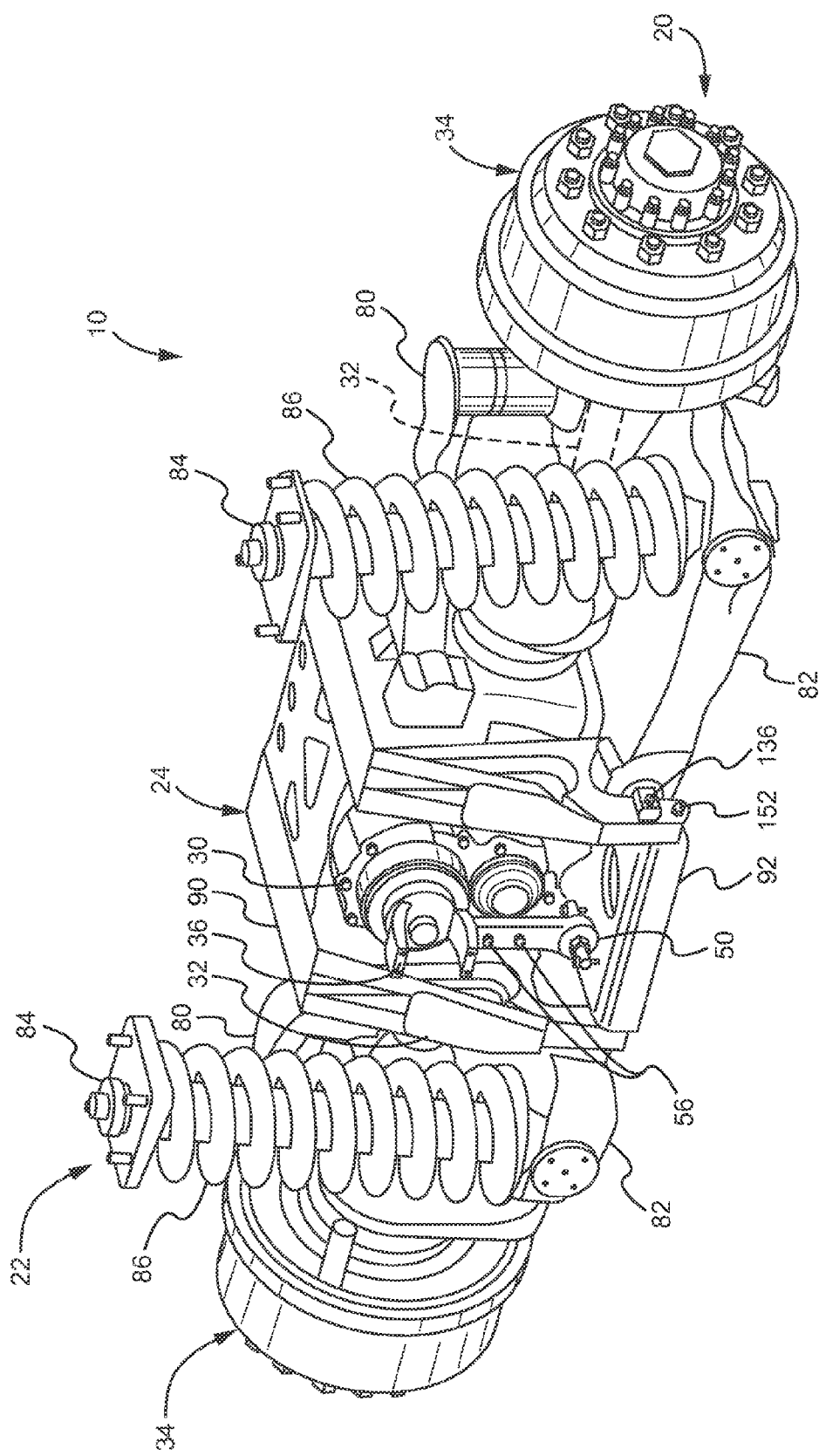
FIG. 1 is a perspective view of an exemplary suspension module.

Referring to FIG. 1, an exemplary suspension module 10 for a vehicle is shown. The suspension module 10 may be provided with a motor vehicle like a truck, bus, farm equipment, military transport or weaponry vehicle, or cargo loading equipment for land, air, or marine vessels. The suspension module 10 may include an axle subassembly 20, a suspension subsystem 22, and a subframe assembly 24.

The axle subassembly 20 may interconnect a plurality of wheel assemblies to the vehicle. In at least one embodiment, the axle subassembly 20 may include a differential 30, at least one half shaft 32, and a wheel hub assembly 34.

Figure 3:
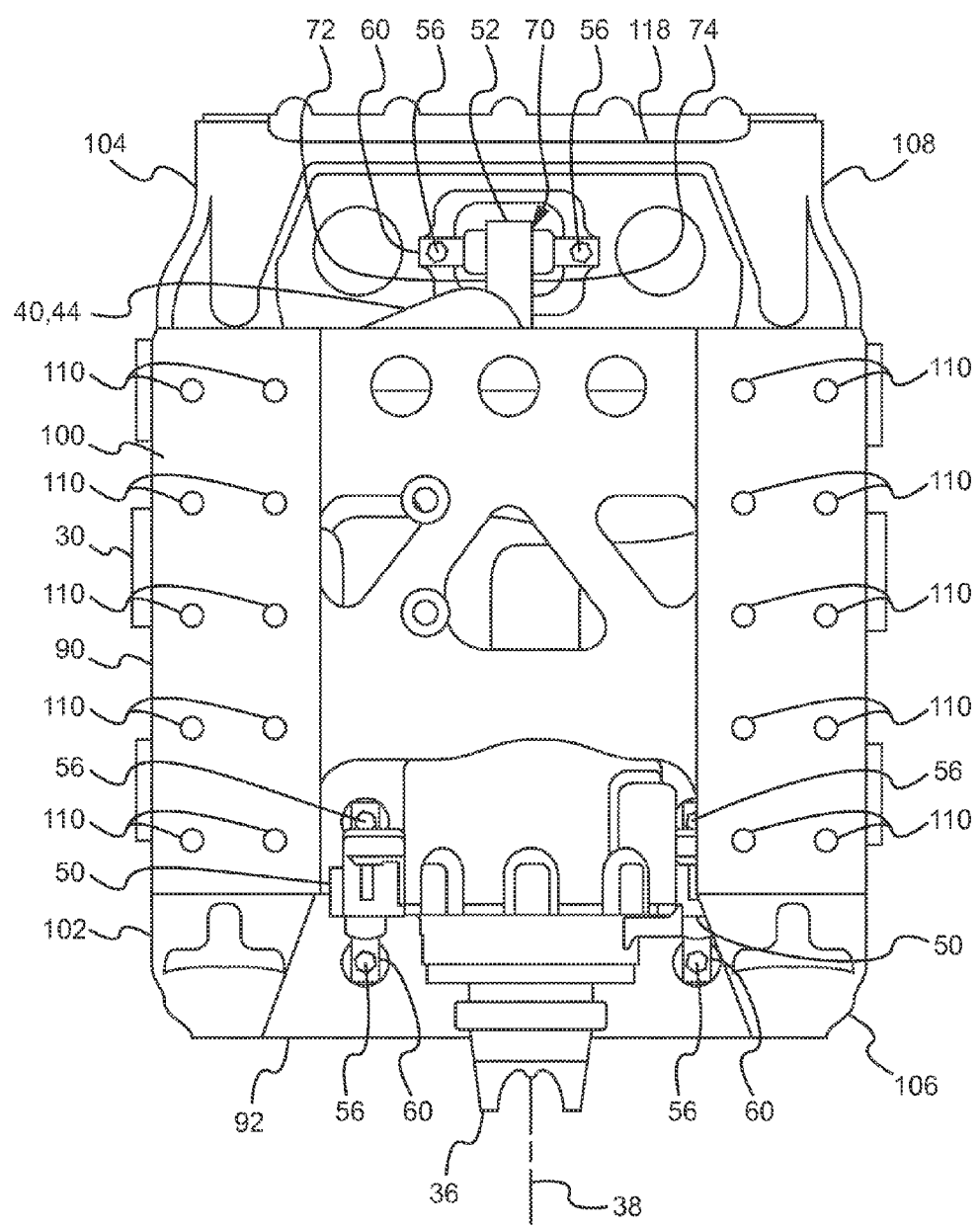
FIG. 3 is a top view of the portion of the suspension module shown in FIG. 2.

The differential 30 may be configured to allow different wheels to rotate at different speeds. The differential 30 may be part of or may be connected to a vehicle drivetrain that may provide torque to one or more wheels. For example, a vehicle drivetrain may include at least one power source, such as an engine and/or electric motor, and a power transfer unit, such as a transmission. The power source may be connected to an input of the power transfer unit. An output of the power transfer unit may be connected to an input 36 or input shaft of the differential 30 via a drive shaft. The drive shaft may rotate the input 36 about an axis of rotation 38, which is shown in FIG. 3.

A half shaft 32 may interconnect the differential 30 to an associated wheel hub assembly 34. In FIG. 1, two half shafts 32 are provided that extend from opposite sides of the differential 30. Each half shaft 32 may extend along and may be configured to rotate about an axis. Each half shaft 32 may be coupled to an output of the differential 30 at a first end and may be fixedly coupled to a corresponding wheel hub assembly 34 at a second end.

The wheel hub assembly 34 may facilitate coupling of a wheel to a half shaft 32. The wheel may be fixedly mounted on and may rotate with the wheel hub assembly 34. A tire may be disposed on the wheel that may engage a road or support surface.

Figure 2:
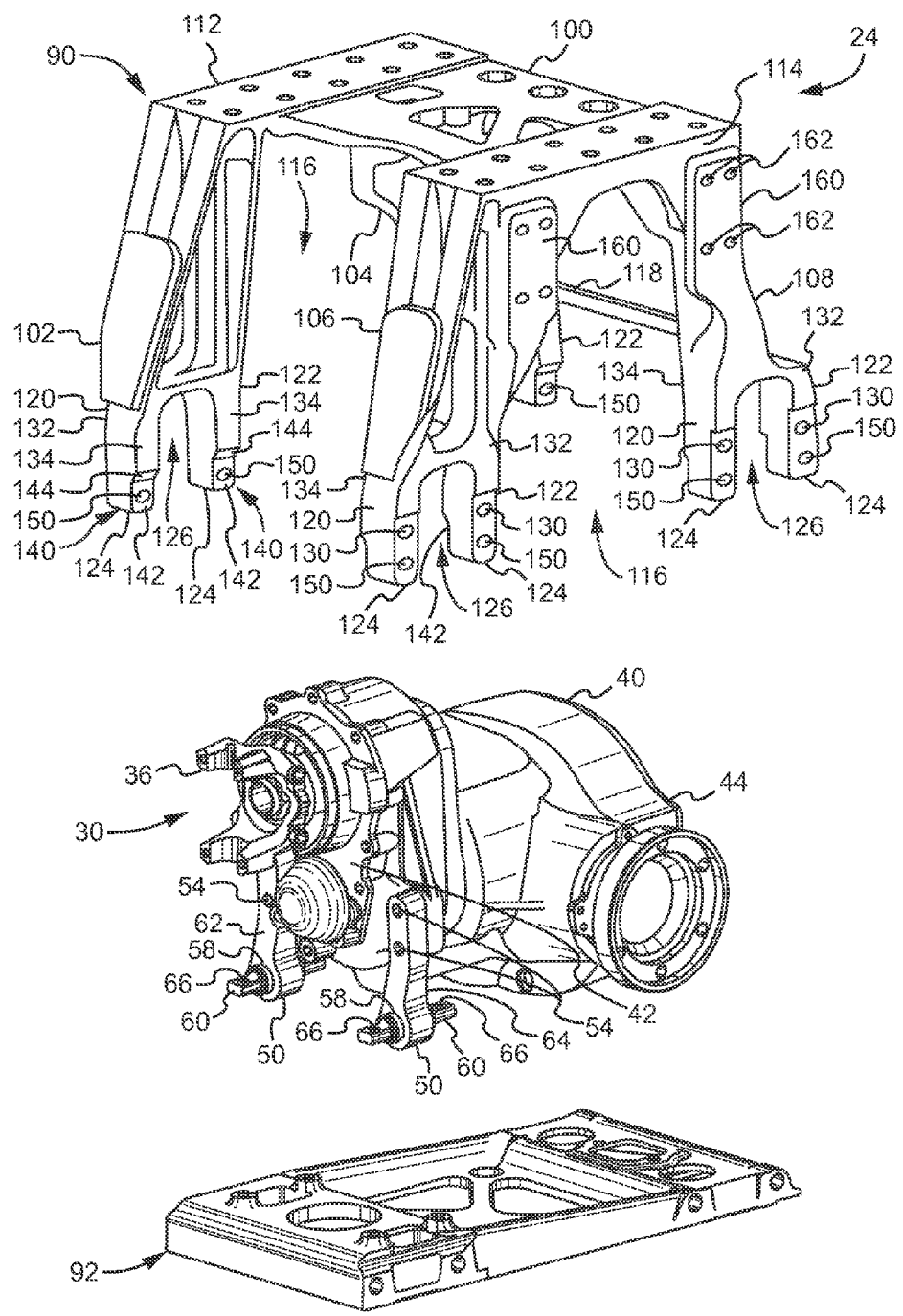
FIG. 2 is an exploded view of a portion of the suspension module including a subframe, a differential, and a skid plate.

The differential 30 may be fixedly mounted on the subframe assembly 24. As is best shown in FIG. 2, the differential 30 may include a housing 40 that may engage or may be mounted to the subframe assembly 24. The housing 40 may be assembled from multiple individual components in one or more embodiments. In addition, the differential 30 may or may not have an output shaft for transmitting torque to another differential, such as in a tandem axle configuration. The differential 30 may have a front side 42 and a rear side 44. The input 36 may extend from the front side 42. The rear side 44 may be disposed opposite the front side 42. The housing 40 may include or may be coupled to a front mounting bracket 50 and a rear mounting bracket 52.

One or more front mounting brackets 50 may interconnect the differential 30 to the subframe assembly 24. In FIGS. 1-3, two front mounting brackets 50 are shown that are disposed on the front side 42 of the differential 30 and disposed proximate opposite sides of the input 36 or on opposite sides of the axis of rotation 38 or a plane that may extend through the axis of rotation 38. The front mounting bracket 50 may be integrally formed with the housing 40 or may be provided as a separate component that is not integrally formed with the housing 40. In FIGS. 1-3, the front mounting brackets 50 are provided separately from the housing 40. The front mounting bracket 50 may include a first end and a second end disposed opposite the first end. One or more differential mounting holes 54 may be provided proximate the first end. The differential mounting holes 54 may each receive a fastener 56, such as a bolt, that may fixedly couple the front mounting bracket 50 to the housing 40. For example, the fastener 56 may extend through a differential mounting hole 54 and into a corresponding threaded hole in the housing 40.

The front mounting bracket 50 may also include a mounting pin hole 58 that may be disposed proximate the second end. The mounting pin hole 58 may extend in the same direction or substantially parallel to a differential mounting hole 54 in one or more embodiments. The mounting pin hole 58 may receive a mounting pin 60. The mounting pin 60 may extend through the mounting pin hole 58 such that first and second ends of the mounting pin 60 protrude from opposite sides of the front mounting bracket 50, such as a first mounting bracket side 62 and a second mounting bracket side 64. The first mounting bracket side 62 may face away from the front side 42 of the differential 30 and the second mounting bracket side 64 is disposed opposite the first mounting bracket side 62. As is best shown in FIG. 2, the first and second ends of the mounting pin 60 may each have a hole 66 that may receive a fastener 56 that may fixedly couple the mounting pin 60 to the subframe assembly 24 as will be discussed in more detail below.

Referring to FIG. 3, the rear mounting bracket 52 may be integrally or non-integrally formed with the differential 30. The rear mounting bracket 52 may be integrally formed with the housing 40 or a housing component, such as a cover portion that may be assembled to a main portion of the housing 40, and may be disposed on the rear side 44 of the differential 30 that may be disposed opposite the input 36. Like the front mounting bracket 50, the rear mounting bracket 52 may include a mounting pin hole 70 disposed proximate a distal end of the rear mounting bracket 52. As is best shown in FIG. 3, the mounting pin hole 70 may receive a mounting pin 60 that may extend through the mounting pin hole 70 such that first and second ends of the mounting pin 60 protrude from first and second sides 72, 74 of the rear mounting bracket 52. The first and second sides 72, 74 may be disposed opposite each other and face toward the wheel hub assemblies 34. As such, the mounting pin hole 70 in the rear mounting bracket 52 may not be disposed parallel to the mounting pin hole 58 in the front mounting bracket 50. In FIG. 3, the mounting pin hole 70 is disposed substantially perpendicular to the mounting pin hole 58. The first and second ends of the mounting pin 60 may each have a hole 66 that may receive a fastener 56 that couples the mounting pin 60 to the subframe assembly 24.

Referring again to FIG. 1, the suspension subsystem 22 may interconnect the axle subassembly 20 to the subframe assembly 24 and/or the vehicle chassis to dampen vibrations, to provide a desired level of ride quality, and/or to control vehicle ride height. The suspension subsystem 22 may include an upper control arm 80, a lower control arm 82, a shock absorber 84, and a coil spring 86.

The upper and lower control arms 80, 82 may couple the subframe assembly 24 to the wheel hub assembly 34. For instance, the upper and lower control arms 80, 82 may be pivotally coupled to the subframe assembly 24 at a first end and may be coupled to the wheel hub assembly 34 at a second end that may be disposed opposite the first end. As such, the upper and lower control arms 80, 82 may permit independent movement of an associated half shaft 32, wheel hub assembly 34, and wheel with respect to the subframe assembly 24 and differential 30. An upper control arm 80 and a lower control arm 82 may be associated with each wheel hub assembly 34. As such, two upper control arms 80 and two lower control arms 82 may be provided with the suspension module 10 and may extend from opposite sides of the subframe assembly 24 to support different wheel hub assemblies 34.

The shock absorber 84 and coil spring 86 may be provided to control and dampen movement of the suspension subsystem 22. In the embodiment shown, the shock absorber 84 is disposed inside of the coil spring 86. The shock absorber 84 and coil spring 86 may each have a first end that is disposed proximate or coupled to the lower control arm 82 and a second end disposed opposite the first end that may be coupled to another component, such as a chassis or frame of the vehicle or the subframe assembly 24. A shock absorber 84 and coil spring 86 may be provided with each lower control arm 82.

Figure 4:
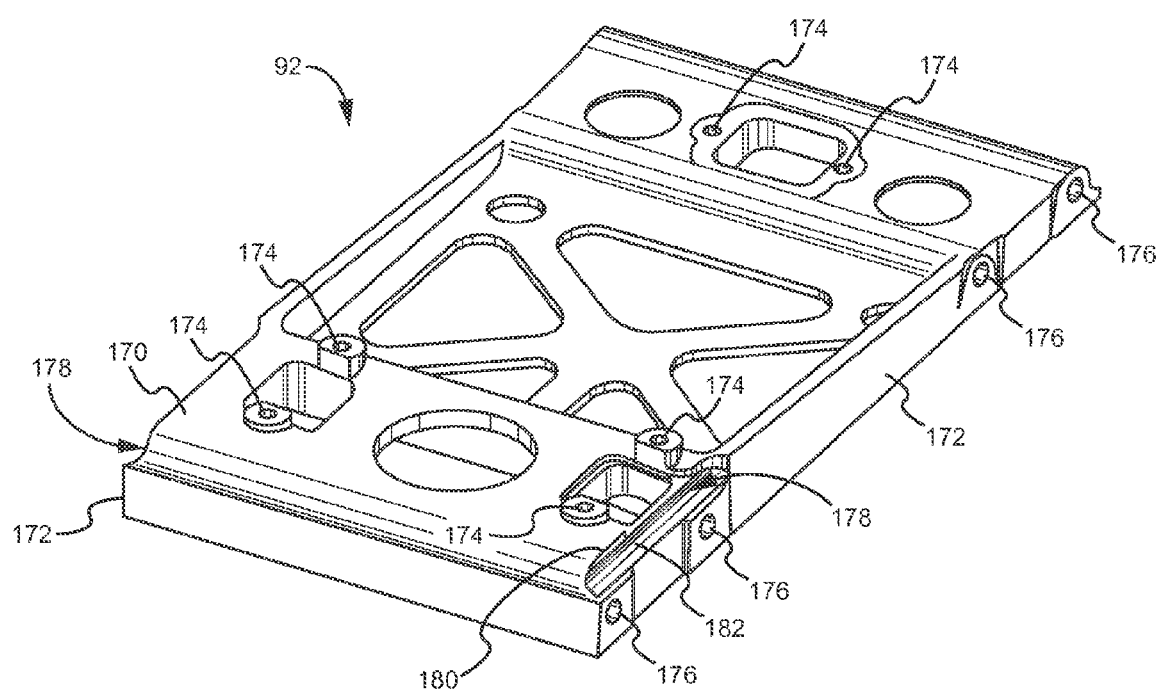
FIG. 4 is a perspective view of the skid plate.

Referring to FIGS. 2-4 the subframe assembly 24 is shown in more detail. The subframe assembly 24 may facilitate mounting of the suspension module 10 to the vehicle. The subframe assembly 24 may include a subframe 90 and a skid plate 92.

The subframe 90 may be configured to be mounted to a portion of the vehicle, such as a frame or chassis. The subframe 90 may or may not be a unitary one-piece component that may be cast or molded to form an individual part. Providing a unitary subframe 90 may reduce weight, eliminate welding operations and associated quality defects (e.g., missing welds, poor quality welds, improper weld location), improve ability to maintain design tolerances, and reduce tooling cost as compared to a weldment configuration. The subframe 90 may include a plate 100, a first arm 102, a second arm 104, a third arm 106, and a fourth arm 108.

The plate 100 may be configured to be mounted to the vehicle. For example, the plate 100 may have a plurality of chassis mounting holes 110 that may facilitate coupling of the subframe 90 to the chassis or frame of the vehicle. Each chassis mounting hole 110 may receive a fastener, such as a bolt, that couples the plate 100 to the chassis. The plate 100 may be disposed above and may be spaced apart from the differential 30.

The first, second, third, and fourth arms 102, 104, 106, 108 may extend from the plate 100 toward the skid plate 92. As is best shown in FIG. 2, the first and second arms 102, 104 may be disposed along a first side 112 of the subframe 90 and the third and fourth arms 106, 108 may be disposed along a second side 114 of the subframe 90 that may be disposed opposite the first side 112. The first and second arms 102, 104 may be spaced apart from each other such that an opening 116 is provided between the first and second arms 102, 104. Similarly, the third and fourth arms 106, 108 may be spaced apart from each other such that an opening 116 is provided between the third and fourth arms 106, 108. The differential 30 and/or a half shaft 32 may be disposed in or may extend through the openings 116.

A brace 118 may extend from the second arm 104 to the fourth arm 108. The brace 118 may structurally reinforce the subframe 90. The brace 118 may be disposed below the plate 100 and above the skid plate 92. In FIG. 2, the brace 118 extends in a generally horizontal direction. Moreover, the brace 118 may be spaced apart from the differential 30 and the skid plate 92 in one or more embodiments.

The first and second arms 102, 104 may be spaced apart from and disposed opposite the third and fourth arms, 106, 108, respectively. The third and fourth arms 106, 108 may be mirror images of the first and second arms 102, 104, respectively. As such, features common to the first, second, third, and fourth arms 102, 104, 106, 108 are designated with common reference numbers below. For brevity, these features are described with reference to the first arm 102 rather than repeating the description for each arm.

The arms may include a first branch 120 and a second branch 122. The first and second branches 120, 122 may be disposed at an end of each arm that may be disposed opposite the plate 100. As such, each arm may have an end surface 124 that is disposed at an end of the first and/or second branches 120, 122. The first branch 120 may be spaced apart from the second branch 122 such that a lower control arm mounting opening 126 is disposed between the first and second branches 120, 122. The lower control arm mounting opening 126 may receive an end of the lower control arm 82 and may be configured as an open ended slot that may be open at an end that is disposed opposite or faces away from the plate 100.

One or more lower control arm mounting holes 130 may be provided on the first and/or second branches 120, 122. The lower control arm mounting holes 130 may be blind holes that extend from an outer surface 132 of an arm that may be disposed proximate the lower control arm 82 toward an inner surface 134 that may be disposed opposite the outer surface 132. As is best shown in FIG. 1, the lower control arm mounting holes 130 may each receive a fastener 136, such as a bolt, that may couple the lower control arm 82 to the subframe 90. The lower control arm mounting holes 130 may be disposed above the skid plate 92 in one or more embodiments.

The mounting notch 140 may be provided with the first branch 120 and/or the second branch 122. The mounting notch 140 may be configured to receive and inhibit movement of the skid plate 92. More specifically, one or more mounting notches 140 may receive and/or engage the skid plate 92 and inhibit the skid plate 92 from moving upward toward the plate 100 in the event that the skid plate 92 encounters a foreign object with enough force to shear the fasteners that couple the skid plate 92 to the subframe 90. Such upward movement could cause the differential 30 or differential carrier to move or be damaged, which in turn may cause additional damage or impair operation of the axle subassembly 20 and/or suspension subsystem 22. The mounting notch 140 may be disposed proximate the end surface 124 and the inner surface 134 of the first arm 102. As such, the mounting notch 140 may be disposed opposite the lower control arm 82.

The mounting notch 140 may include or may be at least partially defined by a first notch surface 142 and a second notch surface 144. The first notch surface 142 may extend from the end surface 124 to or toward the second notch surface 144. The first notch surface 142 may face toward and may engage the skid plate 92 and may be disposed substantially perpendicular to the end surface 124 in one or more embodiments. The second notch surface 144 may extend from the first notch surface 142 to the inner surface 134. The second notch surface 144 may also engage the skid plate 92 and may be disposed at an angle with respect to the first notch surface 142 in one or more embodiments.

A skid plate mounting hole 150 may be provided to facilitate mounting of the skid plate 92 to the subframe 90. The skid plate mounting hole 150 may be a through hole that extends from the outer surface 132 to the first notch surface 142. In the embodiment shown, a skid plate mounting hole 150 is provided with the first branch 120 and the second branch 122 between the end surface 124 and the second notch surface 144. As is best shown in FIG. 1, the skid plate mounting hole 150 may receive a fastener 152, such as a bolt, that may couple the subframe 90 to the skid plate 92.

Referring again to FIG. 2, one or more upper control arm mounts 160 may be provided with the subframe 90 to facilitate coupling of the upper control arm 80. A pair of upper control arm mounts 160 may be provided on the subframe 90 along the first and second sides 112, 114 of the subframe 90. Each upper control arm mount 160 that is disposed on a common side 112, or 114 may facilitate mounting of different ends of the upper control arm 80. For example, each upper control arm mount 160 may have one or more upper control arm mounting holes 162 that may be threaded and configured to receive a fastener, such as a bolt, that couples the upper control arm 80 to the subframe 90.

Referring to FIG. 4, the skid plate 92 may be provided to prevent impact damage to components of the suspension module 10, such as the differential 30. The skid plate 92 may have an upper surface 170 and a pair of lateral surfaces 172. The upper surface 170 may face toward the differential 30. The upper surface 170 may include a plurality of differential mounting bracket holes 174, a plurality of subframe mounting holes 176 and one or more subframe mounting notches 178.

The differential mounting bracket holes 174 may facilitate coupling of the differential 30 to the skid plate 92. In FIG. 4, six differential mounting bracket holes 174 are shown, although it is contemplated that a different number of differential mounting bracket holes may be provided. The differential mounting bracket holes 174 may be aligned with a corresponding hole 66 on a mounting pin 60. For instance, the two pairs of differential mounting bracket holes 174 disposed near the bottom of FIG. 4 may be aligned with corresponding holes 66 of the mounting pins 60 that are provided with the front mounting brackets 50 while the pair of differential mounting bracket holes 174 disposed near the top of FIG. 4 may be aligned with corresponding holes 66 of the mounting pin 60 provided with the rear mounting bracket 52. The differential mounting bracket holes 174 may or may not be through holes that may extend through the skid plate 92.

The subframe mounting holes 176 may facilitate coupling of the skid plate 92 to the subframe 90. In FIG. 4, two pairs of subframe mounting holes 176 are provided along each lateral surface 172. Each subframe mounting hole 176 may be aligned with a corresponding skid plate mounting hole 150 on the first and/or second branches 120, 122 and may receive the fastener 152. As such, the skid plate 92 and differential 30 may be removed by removing the fasteners 152 and decoupling a drive shaft and/or the half shafts 32 from the differential 30, thereby improving differential serviceability (e.g., removal and replacement) as compared to a suspension module having a non-removable skid plate or a differential that is coupled to a subframe.

A subframe mounting notch 178, if provided, may be disposed proximate or extend from the upper surface 170. In FIG. 4, two subframe mounting notches 178 are provided between the along opposing lateral surfaces 172 of the skid plate 92 between the differential mounting bracket holes 174 and the subframe mounting holes 176. The subframe mounting notch 178 may engage a corresponding arm. For example, a subframe mounting notch 178 may be received in the mounting notches 140 on an associated arm. In FIG. 4, subframe mounting notches 178 are provided that are aligned with the first and third arms 102, 106. It is contemplated that the subframe mounting notches 178 may instead be provided for the second and fourth arms 104, 108 or that additional or longer subframe mounting notches 178 may be provided such that a subframe mounting notch 178 may be provided for each arm 102, 104, 106, 108. In addition, it is contemplated that subframe mounting notches 178 may be omitted from the skid plate 92 in one or more embodiments. Each subframe mounting notch 178 may have any suitable cross section that may mate with a corresponding notch 140 on the subframe 90. The subframe mounting notch 178 may include a first subframe notch surface 180 and a second subframe notch surface 182. The first subframe notch surface 180 may extend from the upper surface 170 and may engage the inner surface 134. The second subframe notch surface 182 may extend from the first subframe notch surface 180 to or toward the lateral surface 172 and may engage the second notch surface

144. As such, the mounting notches 140 and subframe mounting notches 178 may cooperate to inhibit lateral movement of the skid plate 92 with respect to the subframe 90 and upward movement of the skid plate 92 toward the plate 100 of the subframe 90. In addition, a subframe mounting notch 178 may provide additional clearance that may facilitate rotation of a corresponding lower control arm 82.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension module for a vehicle, comprising:
   a subframe configured to be mounted to the vehicle, the subframe having first and second arms disposed along a first side of the subframe and third and fourth arms disposed along a second side of the subframe, wherein the first, second, third, and fourth arms extend vertically downward from a plate of the subframe;
   a skid plate directly mounted to the first, second, third, and fourth arms in holes in the skid plate; and
   a differential mounted to the skid plate and spaced apart from the subframe.

2. The suspension module of claim 1 wherein the first side is disposed opposite the second side, the first arm is spaced apart from the second arm, and the third arm is spaced apart from the fourth arm.

3. The suspension module of claim 1 wherein the first arm is disposed opposite and spaced apart from the third arm and the second arm is disposed opposite and spaced apart from the fourth arm.

4. The suspension module of claim 1 wherein the differential is spaced apart from and disposed between the first and second arms and the third and fourth arms.

5. The suspension module of claim 1 wherein the first arm includes a first branch and a second branch that is spaced apart from the first branch, wherein the first and second branches each have a mounting notch.

6. The suspension module of claim 5 wherein the second, third, and fourth arms each include a first branch and a second branch that is spaced apart from the first branch, wherein the first and second branches of the second, third, and fourth arms each have a mounting notch and a skid plate mounting hole that receives a fastener that couples the skid plate to the subframe.

7. A suspension module for a vehicle, comprising:
   a subframe configured to be mounted to the vehicle, the subframe having first and second arms disposed along a first side of the subframe and third and fourth arms disposed along a second side of the subframe;
   a skid plate mounted to the first, second, third, and fourth arms; and
   a differential mounted to the skid plate and spaced apart from the subframe;
   wherein the first arm includes an end surface and a mounting notch that receives the skid plate, wherein the mounting notch is defined by a first notch surface that extends from the end surface and a second notch surface that extends from the first notch surface and away from a lower control arm.

8. The suspension module of claim 7 wherein the end surface is disposed at a distal end of the first arm and is spaced apart from the skid plate.

9. The suspension module of claim 7 wherein the first arm has a skid plate mounting hole that extends through the first notch surface, wherein the skid plate mounting hole receives a fastener that couples the skid plate to the subframe.

10. The suspension module of claim 7 wherein the first notch surface engages a lateral surface of the skid plate and the second notch surface engages an upper surface of the skid plate.

11. The suspension module of claim 10 wherein the first notch surface extends from the end surface to the second notch surface.

12. The suspension module of claim 10 wherein the differential is mounted to the upper surface.

13. The suspension module of claim 12 wherein the differential is mounted to the upper surface of the skid plate with a mounting pin that has first and second holes that each receive a fastener that couples the mounting pin to the skid plate.

14. The suspension module of claim 13 wherein the mounting pin is received in a mounting pin hole of a mounting bracket that extends between the mounting pin and the differential.

15. The suspension module of claim 7 wherein the skid plate includes a subframe mounting notch that engages the mounting notch.

16. The suspension module of claim 15 wherein the subframe mounting notch includes a first subframe notch surface that extends from an upper surface of the skid plate and a second subframe notch surface that extends from the first subframe notch surface, wherein the first subframe notch surface engages an inner surface of the first arm that faces toward the differential and the second subframe notch surface engages the second notch surface.

17. The suspension module of claim 16 wherein the skid plate has a subframe mounting hole that is disposed below and is spaced apart from the first subframe notch surface and the second subframe notch surface, wherein the subframe mounting hole receives a fastener that couples the skid plate to the subframe.

18. The suspension module of claim 7 further comprising an upper control arm that is pivotally mounted to the subframe.

* * * * *